United States Patent Office 2,847,473
Patented Aug. 12, 1958

2,847,473

2,3-DICHLORO-N-(O-CHLOROBENZYLIDENE) ANILINE

Dale N. Robertson, Midland, Mich., assignor to The Dow Chemical Company, Midland, Mich., a corporation of Delaware No Drawing. Application April 10, 1957
Serial No. 651,815

1 Claim. (Cl. 260—566)

The present invention relates to a new compound which is a condensation product of 2,3-dichloroaniline with o-chlorobenzaldehyde. The new compound is characterized by the formula

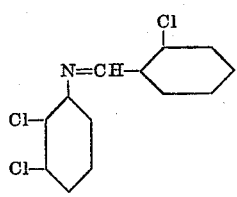

The compound is a crystalline solid somewhat soluble in many organic solvents and of low solubility in water. The compound is useful as an anti-microbial and is adapted to be employed as an active constituent of disinfectant and germicidal compositions for the control of many bacterial and fungal organisms such as *Salmonella typhosa*, *Staphylococcus aureus*, *Aspergillus terreus*, *Rhizopus nigricans*, and the like.

The new compound may be prepared by condensing 2,3-dichloroaniline and o-chlorobenzaldehyde in the presence of an inert organic solvent such as alcohol or benzene. The amount of reactants to be employed is not critical, some of the desired product being produced with any proportion of ingredients. Optimum yields are usually obtained when employing substantially equimolecular proportions of the reactants. The reaction proceeds smoothly at the temperature range of from room temperature to 140° C. with the formation of the desired product and water of reaction.

In carrying out the reaction, the 2,3-dichloroaniline, o-chlorobenzaldehyde and solvent are mixed or otherwise blended together and the resulting mixture at the contacting temperature for a period of time to assure completion of the reaction. During the reaction, the desired product sometimes precipitates in the reaction mixture as a crystalline solid. Upon completion of the reaction, the reaction mixture may be cooled to precipitate the desired product as a crystalline solid or to precipitate further product. The product may be separated in conventional manner such as by filtration or decantation and hereafter purified by recrystallization from a suitable organic solvent.

The following operation illustrates the invention but is not to be construed as limiting the same.

In a representative operation, 8.1 grams (0.05 mole) of 2,3-dichloroaniline was added to 7.0 grams (0.05 mole) of o-chlorobenzaldehyde. The reaction vessel and contents were thereafter allowed to stand at room temperature for four hours. During this period, the reaction mixture became a solid crystalline mass. The latter was dissolved in hot benzene and thereafter cooled to room temperature whereupon a 2,3-dichloro-N-(o-chlorobenzylidene)aniline product precipitated as a crystalline solid and was recovered by filtration. This product was washed with a pertoleum hydrocarbon fraction boiling at from 86° to 100° C. (Skellysolve) and air dried. The washed product had a melting point at 99.5°–100.5° C.

The new 2,3-dichloro-N-(o-chlorobenzylidene)aniline compound has been tested and found to be effective as an antimicrobial. For such use, the product may be dispersed on an inert finely divided solid and employed as a dust. Also, such mixture may be dispersed in water with the aid of a wetting agent, and the resulting aqueous dispersion employed as a spray. In other procedures, the product may be employed as a constituent of oil-in-water emulsions, or water dispersions with or without the addition of wetting, dispersing or emulsifying agents. In representative operations, 2,3-dichloro-N-(o-chlorobenzylidene)aniline was incorporated in a solid nutrient agar medium in an amount sufficient to supply 0.05 percent by weight of the toxicant. Portions of the medium were inoculated with one of the organisms *Salmonella typhosa*, *Staphylococcus aureus*, *Aspergillus terreus* and *Rhizopus nigricans* and the inoculated media incubated at 30° C. After three days incubation, observations showed that the aniline compound had given a 100 percent control of the growth of each of the test organisms.

I claim:
2,3-dichloro-N-(o-chlorobenzylidene)aniline.

References Cited in the file of this patent
UNITED STATES PATENTS 2,583,729   Deanesly _____ Jan. 29, 1952

OTHER REFERENCES

Mayer et al.: Ber. Deut. Chem., 52B, 1641–52 (1919), pp. 1646–47 relied on.